United States Patent [19]

Kamimura et al.

[11] Patent Number: 5,036,352
[45] Date of Patent: Jul. 30, 1991

[54] MICROFILM PROJECTION APPARATUS HAVING ZOOM LENSES

[75] Inventors: Kuniaki Kamimura; Kenji Sawada; Yasushi Yamade, all of Osaka, Japan

[73] Assignee: Minolta Camera Kabushiki Kaisha, Osaka, Japan

[21] Appl. No.: 604,372

[22] Filed: Oct. 26, 1990

Related U.S. Application Data

[63] Continuation of Ser. No. 358,677, May 30, 1989, abandoned.

[30] Foreign Application Priority Data

Jun. 1, 1988 [JP] Japan .................. 63-136455
Jun. 8, 1988 [JP] Japan .................. 63-139374
Jun. 8, 1988 [JP] Japan .................. 63-139375

[51] Int. Cl.$^5$ ............................. G03B 13/28
[52] U.S. Cl. .................... 355/45; 355/55
[58] Field of Search ............ 355/55, 56, 57, 59, 355/77, 60, 44, 45, 40, 41, 243

[56] References Cited

U.S. PATENT DOCUMENTS 4,172,657 10/1979 Watanabe et al. .................. 355/55

FOREIGN PATENT DOCUMENTS 63-118733 5/1988 Japan .

Primary Examiner—Brian W. Brown
Assistant Examiner—Khanh Dang
Attorney, Agent, or Firm—Joseph W. Price

[57] ABSTRACT

A microfilm projection apparatus is disclosed which is usable for a plurality of zoom lenses having different magnification ranges from each other. In the zoom lenses attached, the zoom lens selected from the plurality of zoom lenses to be used is identified. A plurality of specific magnifications corresponding to each zoom lens are memorized. When the zoom lens is set in place, the specific memorized magnifications corresponding to the selected zoom lens are indicated. The magnification of the zoom lens is set to the desired magnification designated from the specific magnifications.

23 Claims, 13 Drawing Sheets

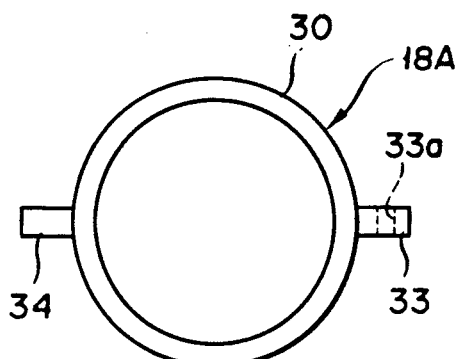
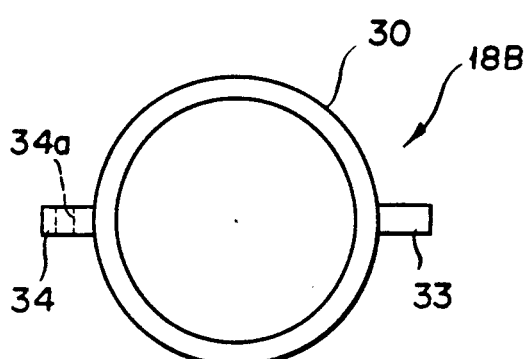
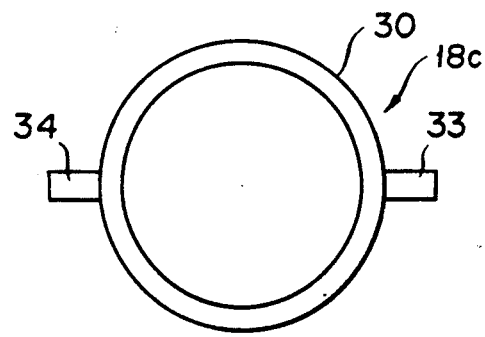
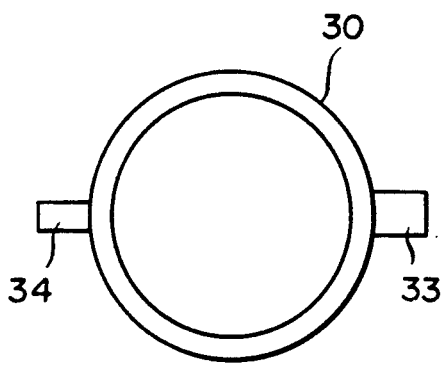
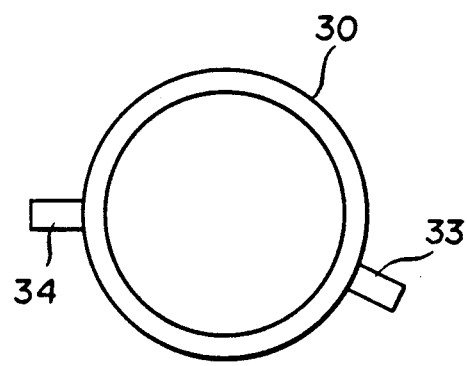

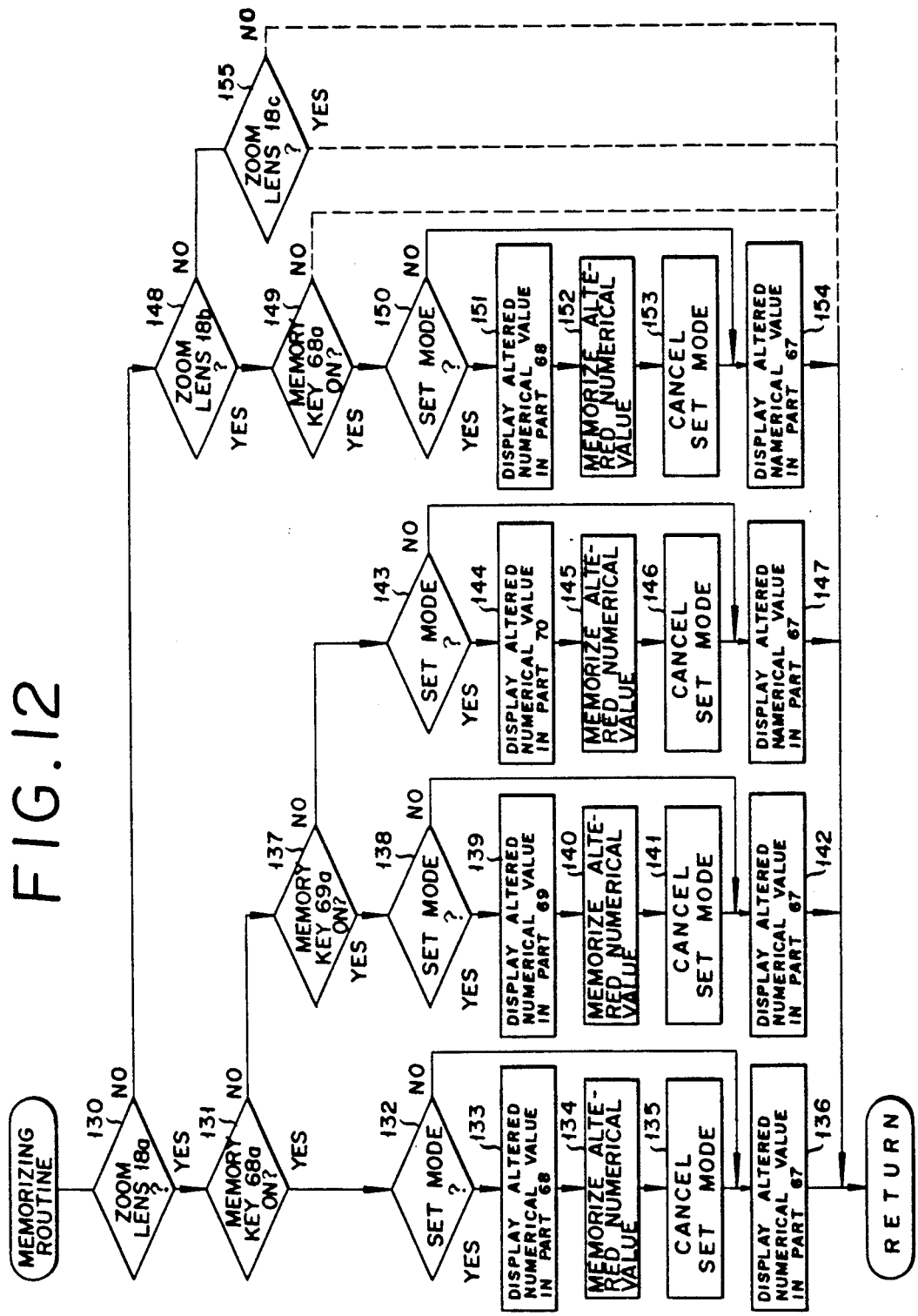

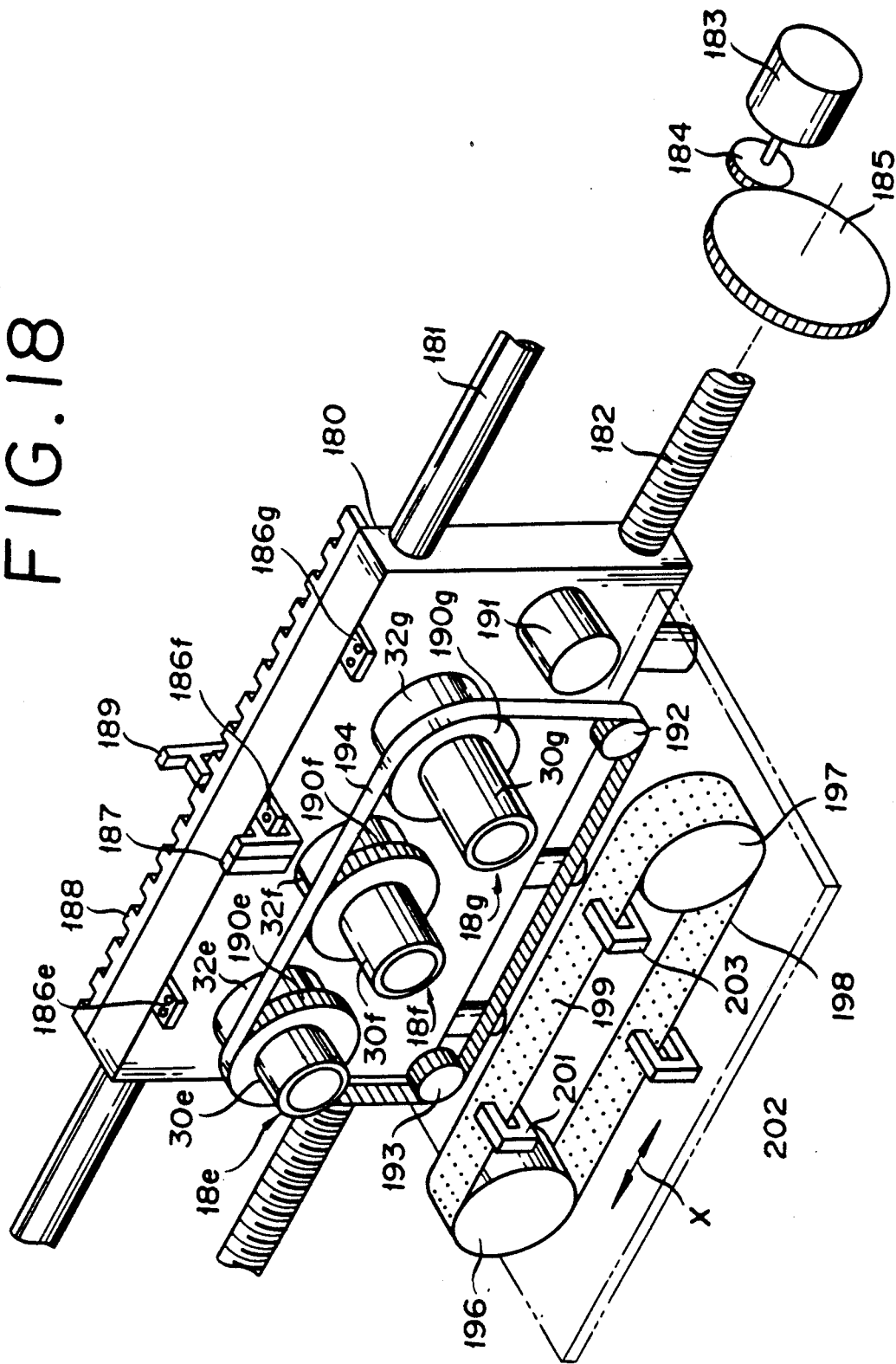

MICROFILM PROJECTION APPARATUS HAVING ZOOM LENSES

This is a continuation of application Ser. No. 348,677, filed on May 30, 1989, for a MICROFILM PROJECTION APPARATUS HAVING ZOOM LENSES, now abandoned.

BACKGROUND OF THE INVENTION

1. Field of the Invention

This invention relates to a microfilm projection apparatus for projecting an image in a microfilm on an image receiving surface by the use of the zoom lens selected from a plurality of zoom lenses.

2. Description of the Prior Art

U.S. Pat. No. 4,172,657 discloses a reader printer capable of being fitted up simultaneously with a plurality of mono-focal lenses of severally different magnifying powers. Though this reader printer is allowed to alter the magnifying power in projection stepwise by the selection of particular mono-focal lenses to be used, it is not allowed to alter continuously the magnifying power in the projection of a microfilm. Therefore, a zoom lens is used, for the purpose of allowing the magnifying power in the projection of a microfilm to be continuously altered. The range in which the magnifying power attained by one zoom lens is limited. To allow a wide range for the magnifying power, the practice of preparing a plurality of zoom lenses having severally different ranges of magnifying power and selectively using a particular zoom lens whose range of magnifying power embraces a desired magnification.

Incidentally, in the field of microfilms, fixed standards are applied to the ratios of reduction and sizes in which microfilms are to be manufactured. When the plurality of zoom lenses are prepared as described above, however, only a few magnifying powers are actually used because the number of magnifying powers frequently used with one zoom lens is fixed in a certain sense. Even in setting such magnifying powers of high frequently in a given zoom lens, the operator is required for each change in magnification to perform a zooming operation on the zoom lens so as to set the prescribed magnifying power.

SUMMARY OF THE INVENTION

A primary object of this invention, therefore, is to provide a microfilm projection apparatus capable of easily setting a desired magnifying power in projection.

Another object of this invention is to provide a microfilm projection apparatus capable of memorizing frequently used magnifying powers for each of a plurality of zoom lenses.

A further object of this invention is to provide a microfilm projection apparatus capable of memorizing frequently used magnifying powers for each of a plurality of zoom lenses and displaying frequently used magnifying powers for a particular zoom lens selected from among the plurality of zoom lenses.

In accordance with one aspect of the invention, there is provided a microfilm projection apparatus for projecting an image recorded on a microfilm onto an image receiving medium, comprising; a plurality of zoom lenses having different magnification ranges from each other; memory means for memorizing a specific magnification corresponding to each zoom lens; identifying means for identifying the zoom lens selected from the plurality of zoom lenses to be used; and setting means responsive to the identifying means for setting the magnification of the selected zoom lens to the specific magnification memorized by the memory means.

BRIEF DESCRIPTION OF THE DRAWINGS

FIGS. 3 A to 3 C are front views illustrating zoom lenses of severally different types.

FIGS. 4 A and 4 B are front views illustrating zoom lenses involves in other different embodiments of this invention.

FIG. 5 b is a front view of the condenser lens of FIG. 5 A.

FIGS. 8 to 15 are flow charts illustrating procedures of control to be used in the present invention.

FIG. 18 is a perspective view illustrating another typical microfilm projection apparatus as yet another embodiment of this invention, having three zoom lenses fixed on a mobile stand.

DESCRIPTION OF THE PREFERRED EMBODIMENTS

Now, the present invention will be described specifically below with reference to the accompanying drawings illustrating embodiments of the present invention.

Figure 1:
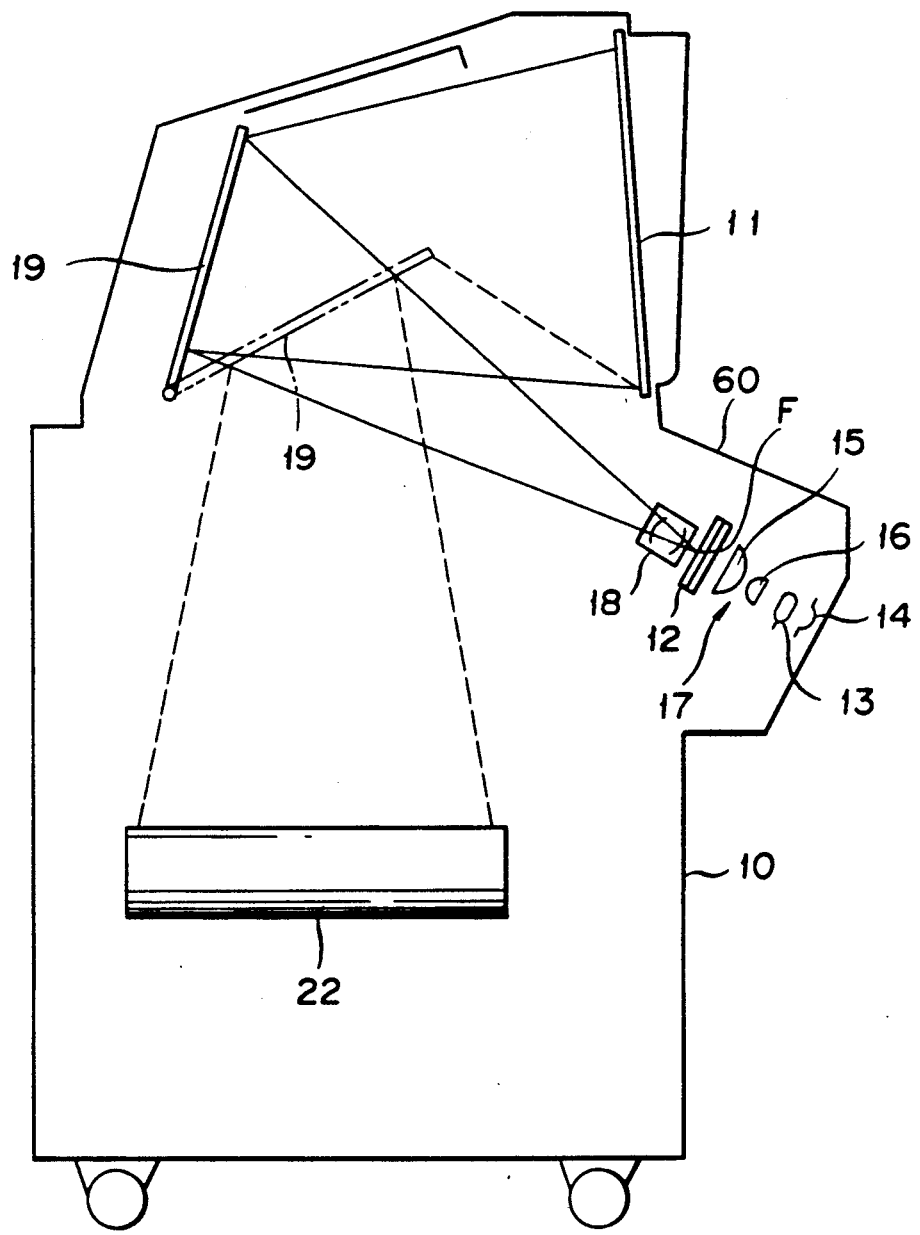
FIG. 1 is a schematic cross section illustrating a reader printer utilizing therein a typical microfilm projection apparatus as one embodiment of this invention.

As illustrated in FIG. 1, a screen 11 is disposed in the upper front side of a reader printer body 10 and a microfilm F having recorded thereon those images to be projected on the screen 11 is retained in a film carrier 12. The direct beam of light issuing from a light source 13 and the beam of light reflected by a reflecting mirror 14 are converged by a condenser lens 17 comprising a stationary lens 15 and a movable lens 16 freely moved toward and away from the stationary lens 15, caused to impinge on and pass through the microfilm F, and brought to a zoom projection lens 18. An image on the microfilm F is magnified by the zoom lens 18, reflected by a mirror 19 disposed behind the screen 11, and projected on the screen 11. In this case, the mirror 19 is retained in the reader position indicated with a solid line. In this state, the image recorded on the microfilm is enabled to be inspected, for example.

For the image projected on the screen 11 to be copied, the reader printer body 10 is provided therein with a photosensitive drum 22. By swinging the mirror 19 to the position indicated with a two-dot line in the diagram, the image is allowed to impinge on this photosensitive drum 22. Since the illustrated reader printer adopts the film scan method, the film carrier 12 during the course of exposure, imparts a scanning motion to the microfilm F in the direction perpendicular to the surface of the microfilm F as synchronized with the rotation of the photosensitive drum 22, with a result that the photosensitive drum 22 is exposed to a slit of light. An electrostatic latent image consequently formed on the photosensitive drum 22 is transferred in the form of a magnified image on a copying paper by known image forming means, giving rise to a corresponding hard copy of the image. In place of the film scan method which effects the scanning of the microfilm F by moving it, any other desired method of exposure such as, for example, the mirror scan method, may be adopted.

Figure 2:
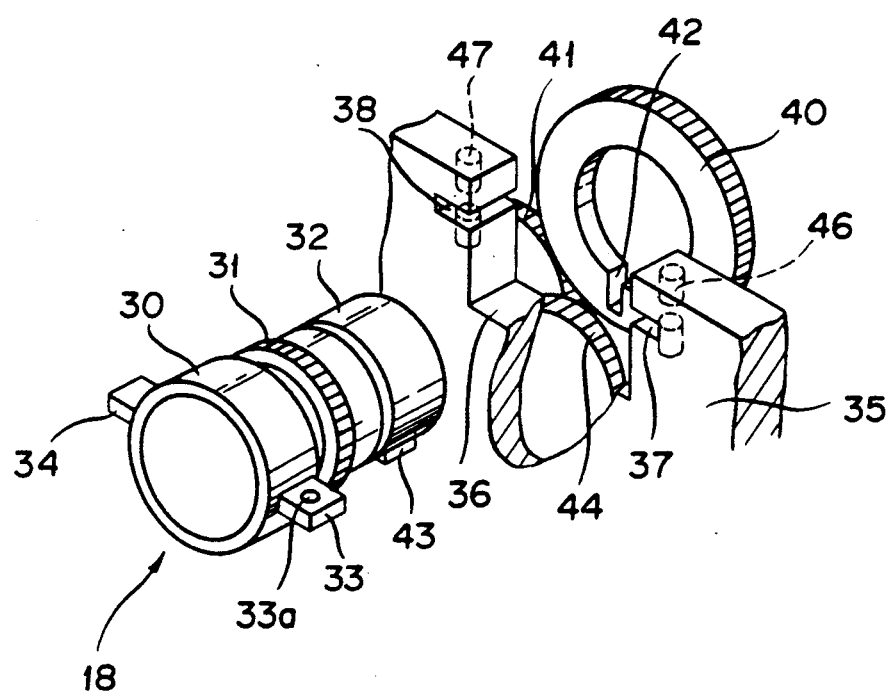
FIG. 2 is a perspective view illustrating a zoom lens and a stationary member for supporting the zoom lens.

The zoom lens 18 appearing in FIG. 1 and a fitting part for supporting this zoom lens 18 are illustrated in detail in FIG. 2. As illustrated, the zoom lens 18 possesses a lens-barrel 30 incorporating therein a plurality of stationary lenses and movable lenses. A focus gear 31 is rotatably fitted around the outer periphery of the lens-barrel 30. It is by transmitting the rotation of this focus gear 31 through the medium of a cam ring or a pin (not shown) to the movable lenses that the focus is finely adjusted.

Further, around the outer periphery of the lens-barrel 30, a zoom rotation member 32 is rotatably fitted. It is by transmitting the rotation of this zoom rotation member 32 through the medium of a cam ring or a pin (not shown) to the zoom lens mentioned above that the magnification of zooming is adjusted. This zoom rotation member 32 is adapted to be reciprocated rotationally between the positions for the minimum and maximum magnifications. The angle allowed for this rotation is not infinite but is limited to a maximum approximately in the range of 100° to 150°.

On the outer periphery of the lens-barrel 30, two projecting parts 33, 34 intended as lens side engaging members are disposed as mutually separated by an angular interval of 180°. Inside the reader printer body 10 to which the zoom lens 18 is fitted, a stationary member 35 for supporting the zoom lens 18 in place is fitted. In this stationary member 35 is formed a recess 36 for insertion of the zoom lens 18. Further in this stationary member 35, slits 37, 38 are formed in such a manner as to open into the recess 36 and serve as stationary side engaging portions for union respectively with the lens side engaging members 33, 34. The attachment of the zoom lens 18 to the reader printer body 10, therefore, is accomplished by the union of the lens side engaging members 33, 34 with the stationary side engaging portions 37, 38. Optionally, the depression-projection relationship of these engaging members and portions illustrated in the diagram may be reversed to suit the occasion.

For the zoom rotation member 32 set in place as described above to be rotated, an annular gear 40 is fitted inside the main body 10 of the reader printer as juxtaposed to the stationary member 35. This annular gear 40 is meshed with a gear 41 which is connected to a motor (not shown). On the inner wall surface of the annular gear 40, a notch 42 is formed to serve as a drive side engaging portions 42. A projecting part 43 which engages with the notch 42 is disposed on the outer periphery of the zoom rotation member 32 of the zoom lens 18 and is formed to serve as a lens side engaging member. When the zoom lens 18 is attached to the stationary member 35, therefore, desired zooming is attained by the fact that the union of the lens side engaging member 43 with the drive side engaging portion 42 allows the rotation of the annular gear 40 to the zoom rotation member 32. A gear 44 adapted to be meshed with the focus gear 31 held in place as described above and allowed to impart rotation thereto is disposed as juxtaposed to the stationary member 35. Optionally, the depression-projection relationship of these engaging members and portions described above may be reserved to suit the occasion.

Since the zooming magnification attainable at 11 with one zoom lens 18 has a limit of its plurality of zoom lenses 18 possessing severally different zooming magnifications. For example, there are used three zoom lenses, i.e. a zoom lens possessing zooming magnifications of 7 to 12, a zoom lens possessing zooming magnifications of 12 to 16, and a zoom lens possessing zooming magnifications of 16 to 24. For the purpose of confirming whether or not the zoom lens 18 has been attached to the stationary member 35 and determining which of the three kinds of zoom lenses 18 mentioned above has been selected for use, photo-interrupters 46, 47 each composed of a light-emitting element and a light-receiving element for sensing the light issuing from the light-emitting element are fixed to the stationary member 35 as located respectively at the positions of the slits 37, 38. These photo-interrupters 46, 47 constitute themselves component parts of discriminating means whose function it is to determine which of the three zoom lenses has been selected for use.

The three zoom lenses mentioned above are rendered discriminable from one another by varying the shapes of the lens side engaging members 33, 34 as illustrated in FIG. 3 A to FIG. 3 C. The zoom lens 18a illustrated in FIG. 3 A has a hole 33a for passing the light from the light emitting element of the photo-interrupter 46 formed in the lens side engaging member 33 and no hole passing the light from the light emitting element of the photo-interrupter 47 formed in the other lens side engaging member 34. The zoom lens 18b illustrated in FIG. 3 B has a similar hole 34a formed conversely in the lens side engaging member 34 and no hole formed in the other lens side engaging member 33. The zoom lens 18c illustrated in FIG. 3 C has no hole formed in either of the lens side engaging members 33, 34.

When the light receiving elements of the photo-interrupters 46, 47 sense the impingement of light namely when the two photo-interrupters are both in the OFF state, the absence of the attachment of any of the zoom lenses to the stationary member 35 is discerned. When either or both of the photo-interrupters assume the OFF state, the fact that a zoom lens has been attached is confirmed and the identification of the particular zoom lens selected from among the three is attained. In the illustrated embodiment, the zoom lens 18a appearing in FIG. 3 A possesses zooming magnifications of 1:7 to 12, the zoom lens 18b in FIG. 3 B zooming magnifications of 1:12 to 16, and the zoom lens 18c in FIG. 3 C zooming magnifications of 1:16 to 24.

The attachment of the zoom lens 18 must be carried out correctly so that the lens side engaging members 33, 34 and the stationary side engaging members 37, 38 are combined as prescribed. For the purpose of infallibly avoiding incorrect attachment of the zoom lens 18, one of the two lens side engaging members, specifically the engaging member 33, for example, may be given a greater thickness or projected to a greater length than the other engaging member as illustrated in FIG. 4 A. Otherwise, the angular interval between the two engaging members 33, 34 relative to the center of the lens-barrel 30 may be set to other than 180° as illustrated in FIG. 4 B. When the engaging members 33, 34 are set in this manner, the stationary side engaging members 37, 38 are correspondingly shaped differently from those appearing in FIG. 2.

When the number of zoom lenses 18 to be attached is greater than the three involved in the present embodiment, two or more photo-interrupters for each of the zoom lenses are attached to the stationary member 35 and two or more holes corresponding to the photo-interrupters are disposed in the lens side engaging members.

When none of the zoom lenses 18 is attached as illustrated in FIG. 2, namely when the lens side engaging members 33, 34 are not in union with the as illustrated side engaging members 37, 38, all of the photo-interrupters 46, 47 are in the OFF state. In this case, notch 42 formed in the annular gear 40 is controlled to assume a prescribed standard zooming position by a pulse motor (not shown) adapted to drive the annular gear 40. This standard zooming position is set at a prescribed projection magnification of the relevant zoom lens 18, such as, for example, the position of the minimum magnification, the medial magnification, or the maximum magnification.

When the standard zooming magnification is set at the minimum magnification, for example, and when the zoom lens 18a possessing the zooming magnifications of 7 to 12 is attached, the operator is required to rotate the zoom rotation member 32 so that the zoom lens 18a assumes the position of the zooming magnification of 7. Since the annular gear 40 is so positioned that the drive side engaging portion 42 formed therein assumes the prescribed position, when the operator brings the lens side engaging members 33, 34 into engagement with the stationary side engaging portions 37, 38 to effect the attachment of the zoom lens 18a, the lens side engaging member 43 and the drive side engaging portion 42 coincide with each other and the zoom lens 18a is attached as accurately set at the prescribed standard zooming magnification. This principle applies to the other zoom lenses 18b, 18c.

If the operator should attempt to carry out the work of attaching the zoom lens without setting the zoom rotation member 32 to the position for the prescribed zooming magnification, the work of attachment itself will not be attained because the lens side engaging member 43 and the drive side engaging portion 42 do not coincide and are prevented from being engaged with each other. When the zoom lens 18 is attached with the aid of the zoom rotary member 32, the attachment is attained with the zoom lens 18 accurately set in the position for the prescribed standard zooming magnification. No matter which of the plurality of zoom lenses 18 may be attached, therefore, it can be attached with the minimum zooming magnification as the standard for positioning, for example. The existing projection magnification of the zoom lens 18, therefore, can be discerned by detecting the rotational stroke of the annular gear 40 due to the zooming operation performed by the operator. When the condenser lens 17 illustrated in FIG. 1 is caused to operate in conformity with the projection magnification, it forms the image in the optimum condition free from uneven illuminance and proportionate to a desired zooming magnification.

Figure 5A:
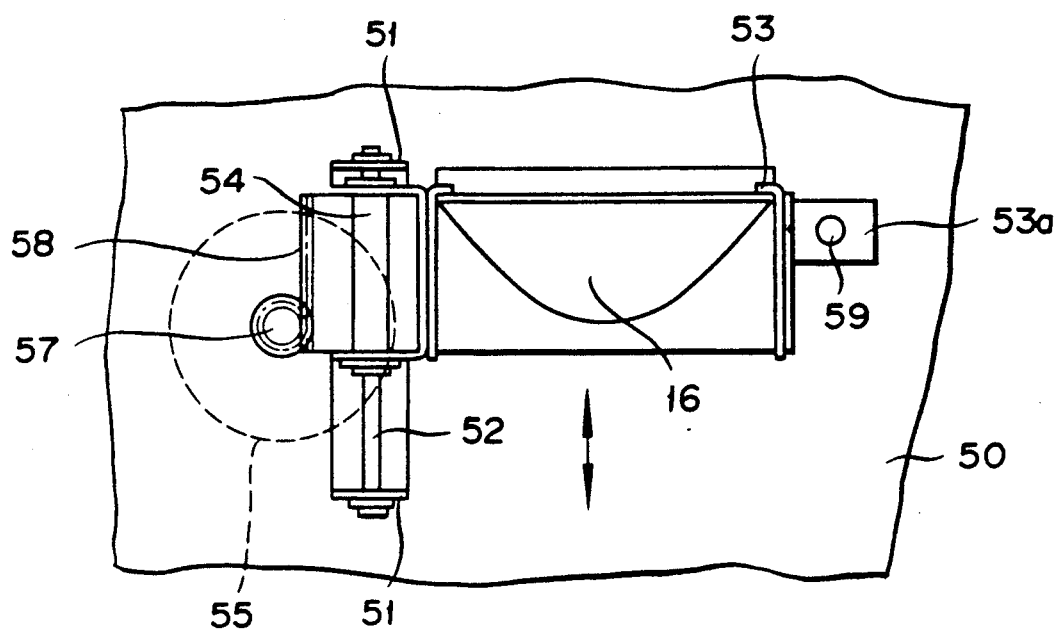
FIG. 5 A is a plan view illustrating in detail a condenser lens.
Figure 5B:
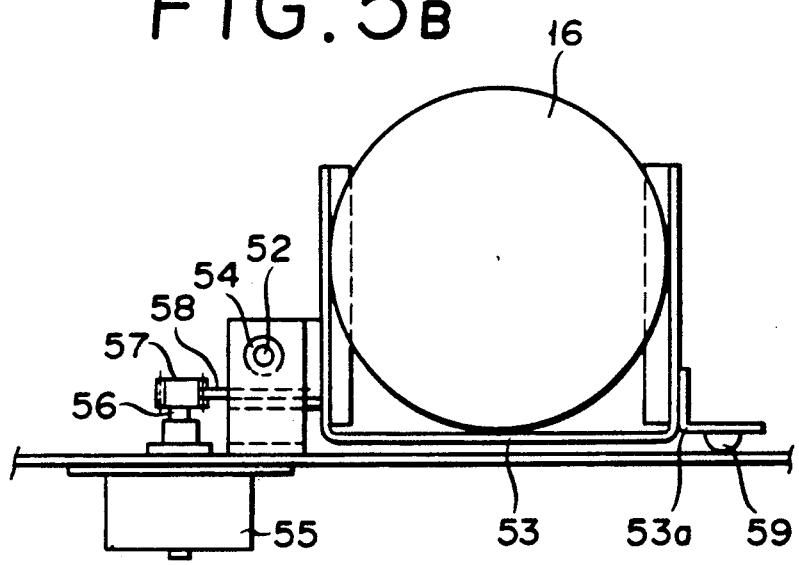

FIG. 5 A and FIG. 5 B illustrate a drive part for moving the movable lens 16, a component of the condenser lens 17, in conformity with a zooming magnification. As illustrated, a guide shaft 52 is fixed with a bracket 51 to a supporting plate 50 which is set in place inside the reader printer body 10 and a holder 53 having the lens 16 fixed thereto is fitted to a sleeve 54 slidably inserted in the guide shaft 52. For the purpose of moving the lens 16 in the direction of its optical axis, a pinion gear 57 is fixed to a main shaft 56 of a motor 55 attached to the supporting plate 50 and a rack gear 58 fixed to the sleeve 54 is meshed with the pinion gear 57. When the motor 55 is set operating, therefore, the lens 16 is moved in the direction of the arrow shown in FIG. 5 A. For the purpose of smoothing this motion of the lens 16, a runner 59 formed of a ball or a spherical projection and adapted to slide on the surface of the supporting plate 50 is attached to a supporting member 53a attached to the holder 53.

Figure 6:
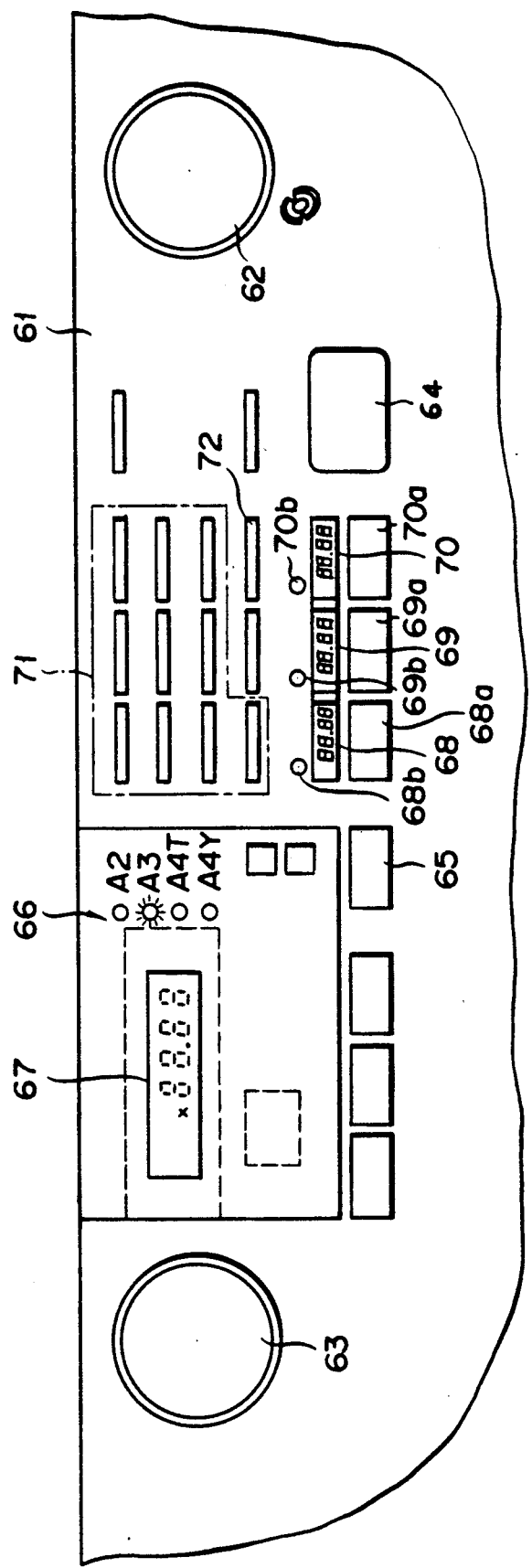
FIG. 6 is a plan view illustrating a part of an operation panel installed on a reader printer illustrated in FIG. 1.

In the front central part 60 of the reader printer body 10 illustrated in FIG. 1, an operation panel 61 illustrated in FIG. 6. In the front central part 60 of the reader printer body 10 illustrated in FIG. 1, an operation panel 61 illustrated in FIG. 6 is installed. On this operation panel 61, a focus dial 62 for effecting the ON-OFF control of a motor serving to drive the gear 44 meshed with the focus gear 31 illustrated in FIG. 2 and a zoom dial 63 for effecting the ON-OFF control of a motor serving to drive the annular gear 40 meshed with the zoom rotation member 32 through the medium of the gear 41 are set in place. A print switch 64 to be used in printing a retrieved image on a copying paper and a paper size select switch 65 for setting the size of a copying paper are set in place on the operation panel as illustrated in FIG. 6. The size of copying paper is displayed in a display part 66 formed of an LED.

Any of a plurality of zoom lenses having mutually different ranges of zooming magnifications such as, for example, the three zoom lenses 18a to 18c, is to be attached to the fixing member 35 illustrated in FIG. 2. For the purpose of displaying the existing projection magnification of the particular zoom lens so attached, a display part 67 is installed on the operation panel 61. This display part 67 possesses four display elements each consisting of seven segments, so as to display magnifications with numerals consisting of not more than two decimal places on either side of the decimal point.

In the preceding embodiment presuming use of three zoom lenses, for example, one of the zoom lenses possesses a zooming range of 7 to 12 magnifications. Even when the zoom lens 18a possesses such a range of projection magnifications as mentioned above, it sometimes happens that the number of frequencies to be used frequently is limited to one or to only a few. In the present embodiment, therefore, three desired magnifications are set in advance for each of the three zoom lenses 18a to 18c possessing mutually different zooming ranges and these three desired magnifications are put to storage. For the purpose of displaying the three frequently used zooming magnifications set for the particular zoom lens attached, set magnification display parts denoted by reference numerals 68 to 70 are installed on the operation panel 61. Similarly to the display part 67, these set magnification display parts 68 to 70 each possess display elements each consisting of seven segments. Three magnification memory keys 68a to 70a corresponding to the set magnification display parts are disposed. When any of these keys is depressed, the zoom lens is set to the corresponding frequently used zooming magnification. For the purpose of presenting the fact that this magnification has been set, lighting parts 68b to 70b each formed of an LED, for example, are disposed so as to correspond to the display parts 68 to 70. The number of frequently each formed of an LED, for example, are disposed so as to correspond to the display parts 68 to 70. The number of frequently used zooming magnifications may be other than the three mentioned above. It may be one or more than three, for example.

When the attachment of the zoom lens 18a possessing the zooming range of 7 to 12 magnifications is assumed and when the lowest magnification is set as the standard zooming magnification, the operator attaches the zoom rotation member 32 of the zoom lens to the fixing member 35, with the zooming magnification set at 7. In this case, the zoom lens 18a cannot be attached unless this particular standard zooming magnification is set. When the attachment is completed, the pertinent zooming magnification or the lowest magnification of 7.00 is displayed on the display part 67. When the zooming magnifications of relatively high frequency of use for the zoom lens 18a are 8, 10, and 12, for example, these three zooming magnifications are displayed respectively in the set magnification display parts 68 to 70 on the condition that they are stored in advance. When the zooming magnification is set at 12, for example, the annular gear 40 is driven by the motor and zoom lens 18a is set at this particular zooming magnification by the depression of any of the magnification memory keys 68a to 70a corresponding to the set magnification display parts 68 to 70. When this magnification is set, the numerical value thereof "12.00" is displayed in the display part 67. As a result, the motor 55 is set operating to actuate the condenser lens in conformity with the magnification and consequently give rise to the prescribed luminance of perfect uniformity.

Naturally by the manipulation of the zoom dial 63, the operator is allowed to set any stated magnification other than the three magnifications which are kept in storage. Further, a ten-key pad 71 installed on the operation panel 61 may be used for setting and stated magnification.

When a different magnification is injected through the the zoom dial 63 or the ten-key pad 71, this magnification is displayed in the display part 67 and, at the same time, the zoom lens 18 and the condenser lens 17 are moved to the corresponding positions. When a magnification deviating from the range of magnifications fixed for the zoom lens 18, however, the zoom lens 18 is automatically set to the magnification of the upper limit or lower limit of the range, whichever is closer to the input magnification. If the zoom dial 62 is turned or the ten-key pad 71 is depressed to inject a magnification deviating from the range mentioned above, the motor is not set operating to preclude misadjustment due to an overdrive of the motor. A magnification set key 72 is installed for memorizing the zoom magnification which comprises canceling a formerly memorized magnification and memorizing a new frequently used magnification is can be carried out by depressing the magnification set key 72. To be specific, the correction of the magnification mentioned above is accomplished by first depressing the key 72, then causing the new magnification to be displayed in the display part 67 by the manipulation of the zoom dial 63 or the ten-key pad 71, and depressing any of the memory keys 68a to 70a corresponding to the magnification meant for the correction.

Figure 7:
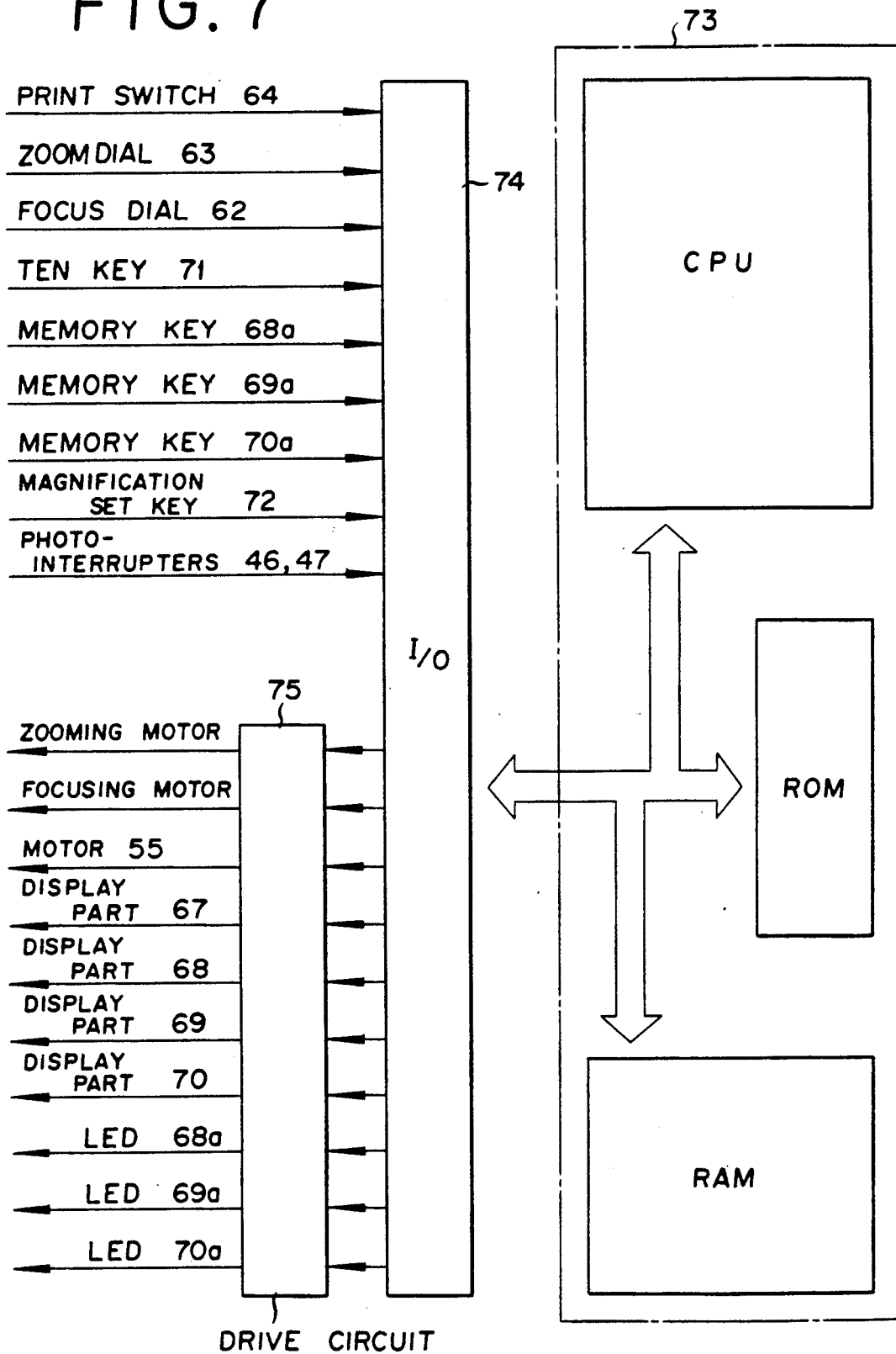
FIG. 7 is a block diagram illustrating a control circuit of the present invention

FIG. 7 is a block diagram illustrating the control circuit for use in the reader printer To a control part 73 possessing a micro-computer CPU and a memory means ROM and RAM, the signals such as from the print switch 64 are introduced through the medium of an input-output port 74. This control part 73 issues control signals to the zooming motors etc., through the medium of the port 74 and a drive circuit 75.

The signals from the photo-interrupters 46, 47 illustrated in FIG. 2 are forwarded via the port 74 to the CPU, there to be computed for disclosure of the identity of the zoom lens 18. The decision as to whether or not any of the zoom lenses 18 is set in place can be made through observation of the ON-OFF state of the photo-interrupters 46, 47. In the absence of the attachment of the zoom lens 18, the annular gear 40 is positioned so that the drive side engaging portion 42 assumes the stated position. The signal for this positioning is issued from the CPU to the motor which drives the annular gear 40 in accordance with the computation within the CPU.

Where three frequently used zooming magnifications are set for one zoom lens 18 and a total of three zoom lenses are used for selective attachment, the apparatus is required to be capable of memorizing a total of nine frequently used zooming magnifications. These zoom magnifications are adapted to be stored in the RAM and they can be rewritten with a signal from the CPU, for example. The memorization of the frequently used zooming magnifications by memory means such as the RAM is accomplished by causing the magnifications themselves or the amounts of zooming motion to be memorized.

In the actuation of the zoom lens 18 from the position of one of the three standard zooming magnifications to the position of the stated magnification to be used, the signal to be supplied to the motor for the actuation of the zoom lens 18 varies with the kind of zoom lens. The formulas of computation fixed one each for the zoom lenses 18 are kept stored in the ROM, for example, and the amount of zooming motion of a given zoom lens is computed in the CPU on the basis of the relevant formula selected from those in storage.

Now, the procedure for the operation of the reader printer incorporating the apparatus of this invention for lens fixation will be described below with reference to the flow charts of FIGS. 8 to 16.

Figure 8:
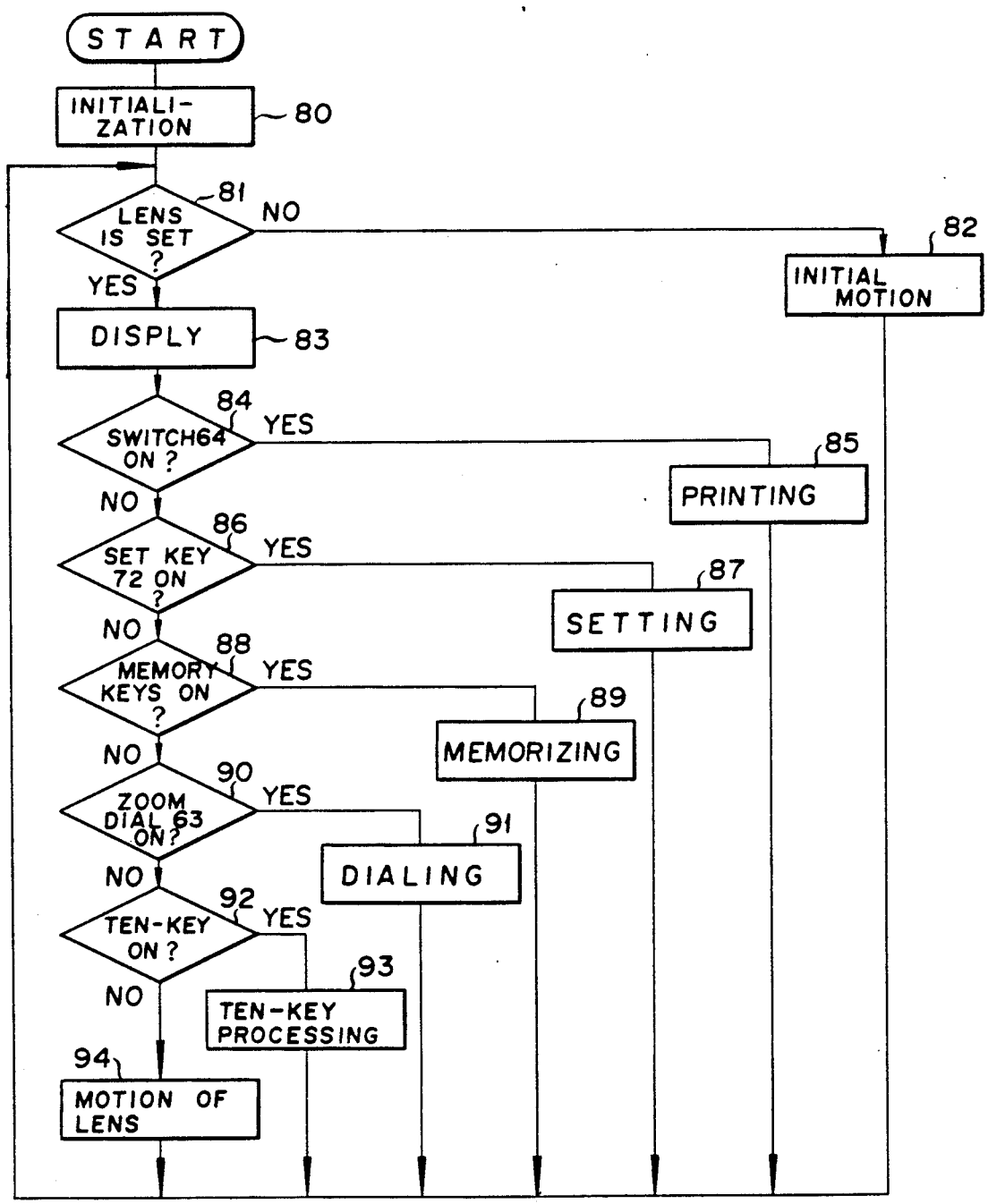

FIG. 8 is a main flow chart of consecutive steps in the operation of control with the CPU illustrated in FIG. 8 is a main flow chart of consecutive steps in the operation of control with the CPU illustrated in FIG. 7. When the CPU is reset to start a program, it is initialized at Step 80 of FIG. 8. First, at Step 81, a decision is made as to whether or not the zoom lens 18 is set in place within the apparatus body 10. When the decision is that the attachment of the zoom lens has not been made, the subroutine for an initial motion is executed at Step 82. This subroutine is illustrated in detail in FIG. 9. When the decision made at Step 81 is that the attachment of the zoom lens 18 has been made, the subroutine for display is executed at Step 83. This subroutine 83 for display is illustrated in FIG. 10.

Figure 11:
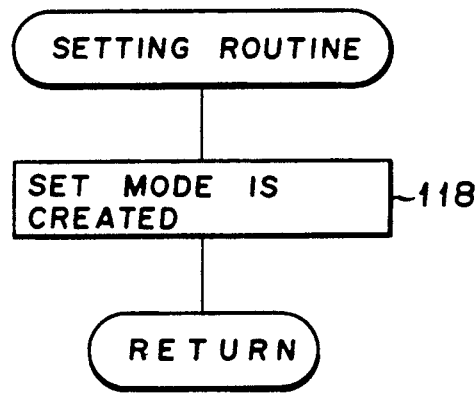

In the copying of an image, when the fact that the print switch 64 illustrated in FIG. 6 is depressed in discerned at Step 84, the subroutine for processing is executed at Step 85 to effect the printing of the image on a copying paper. In the absence of the depression of the print switch 64, a decision is made at Step 86 as to whether or not the magnification set key 72 is ON. When the decision draws an affirmative answer, the subroutine for setting is executed at Step 87. This subroutine for setting is illustrated in FIG. 11. In the absence of the depression of the magnification set key 72, a decision is made at Step 88 as to which of the magnification memory keys 68a to 70a has been depressed. When the decision is that any of these memory keys has been depressed, the subroutine for memory is executed at Step 89. This subroutine for memory is illustrated in FIG. 12.

Figure 13:
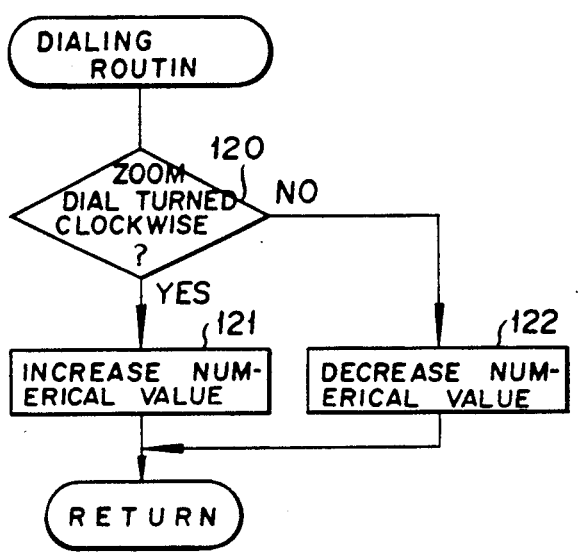
Figure 15:
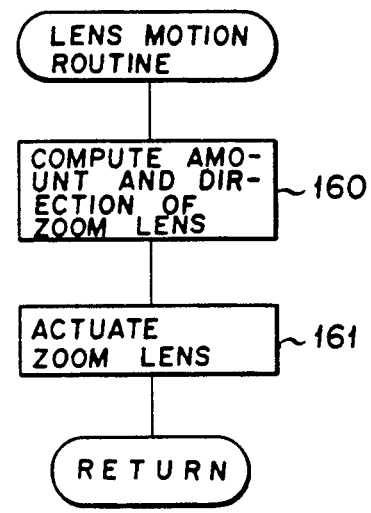
Figure 14:
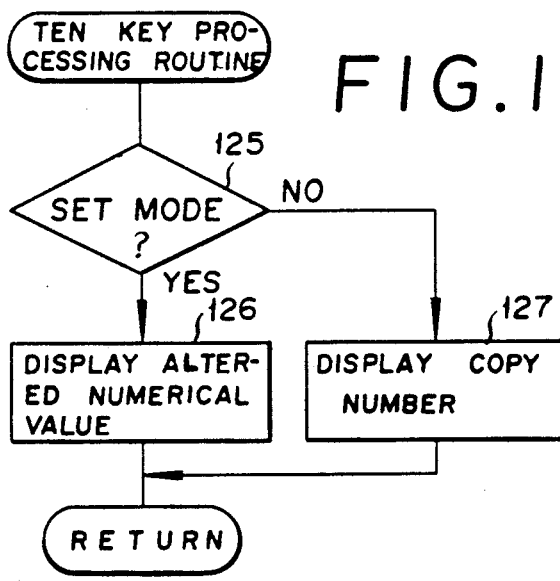

When the decision at Step 88 is that none of the memory keys has been depressed, a decision is made as to whether or not the zoom dial 63 has been actuated When the decision at Step 90 draws an affirmative answer, the subroutine for dialing is executed at Step 91. The subroutine for dialing is illustrated in FIG. 13. When the decision at Step 90 draws a negative answer, a decision is made at Step 92 as to whether or not the ten-key pad 71 has been turned ON. When the decision at Step 92 draws an affirmative answer, the subroutine for manipulation of the ten-key pad is executed at Step 93. This subroutine for ten-key pad manipulation is illustrated in FIG. 14. When the decision at Step 92 draws a negative answer, the subroutine for the motion of lens is executed at Step 94. The subroutine for the lens motion is illustrated in FIG. 15.

Figure 9:
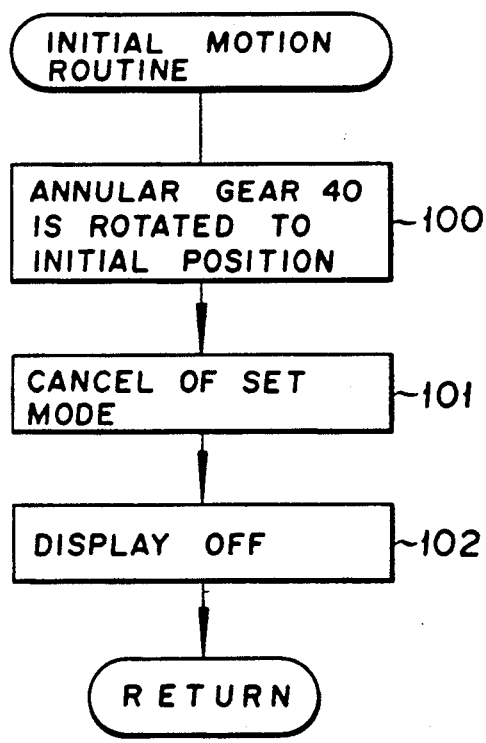
Figure 10:
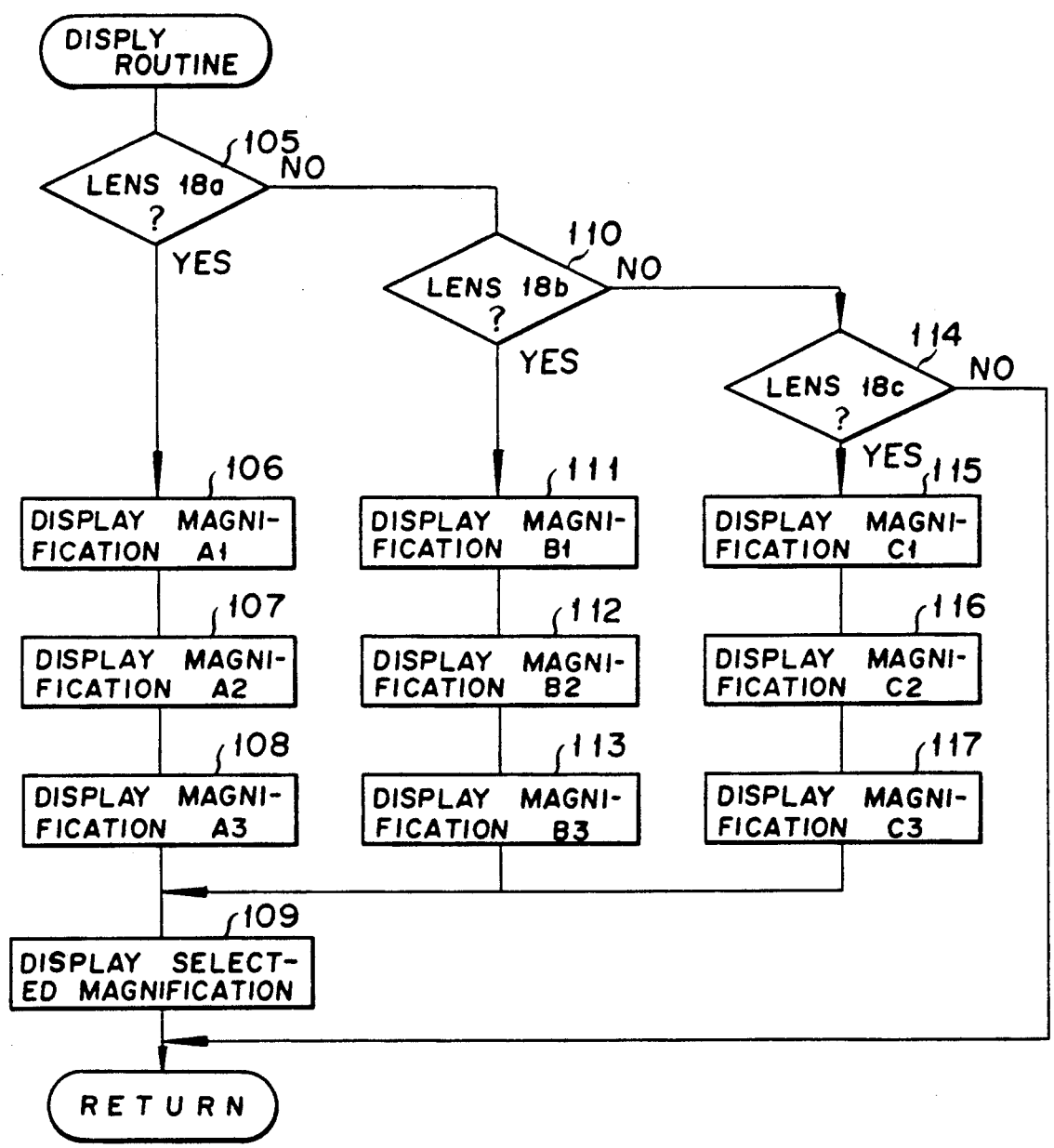

FIG. 9 is a diagram illustrating the subroutine for the initial motion indicated at Step 82. When none of the zoom lenses 18 has been attached, the annular gear 40 is rotated so that the drive side engaging member 42 formed therein assumes the initial position at Step 100. This initial position equals the standard zoom position of each of the zoom lenses 18. A given zoom lens 18 cannot be attached unless it is set at the standard zoom position. When the zoom lens 18 is set in place at all, it never fails to be set at the standard zoom position. After the setting at the initial position has been made at Step 100, the set mode is canceled at Step 101 and the display parts 67 to 70 illustrated in FIG. 6 are switched off at Step 102. The action at Step 100 is mainly executed when the zoom lens 18 is detached. For the purpose of ensuring the execution of Step 100 after complete detachment of the zoom lens 18 from the fixing member 25, a prescribed time delay may be interposed with a timer between the completion of the detachment of the zoom lens 18 and the execution of this step.

The subroutine for display which is executed at Step 83 when the decision at Step 81 is that the zoom lens 18 has been set in place ° will be described specifically with reference to FIG. 10. It is assumed that three zoom lenses bearing the reference numerals 18a to 18c mentioned above and differing in range of zooming and their respective frequently used zooming magnifications, A1 to A3, B1 to B3, and C1 to C3 are memorized.

When a decision is made at Step 105 that the zoom lens 18a has been set in place, the frequently used zooming magnifications A1 to A3 memorized in advance are displayed respectively in the display parts 68 to 70 at Steps 106 to 108. The magnification selected by manual operation of keys or dial or set at the time of the attachment of the zoom lens is displayed in the display part 67 at Step 109.

Similarly when the zoom lens 18 set in place is discerned to be the zoom lens 18b at Step 110, the magnifications B1 to B3 are displayed respectively in the set magnification display parts 68 to 70 at Steps 111 to 113. When the zoom lens 18 set in place is discerned to be the zoom lens 18c at Step 114, the memorized frequently used zooming magnifications are respectively displayed in the set magnification display parts 68 to 70 at Steps 115 to 117.

When the decision made at Step 86 is that the magnification set key 72 has been depressed for altering the numerical values of frequently used zooming magnifications memorized in advance for the zoom lenses 18, the subroutine for setting the mode is executed at Step 118 as illustrated in FIG. 11. When the set mode is created as described above, the frequently used zooming magnifications can be corrected.

Incidentally, the alteration of a zoom magnification is accomplished by rotating the zoom dial 63 or manipulating the ten-key pad 71. When the decision made at Step 90 as illustrated in FIG. 8 is that the zoom dial 63 has been turned, the subroutine for dialing illustrated in FIG. 13 is executed. When the decision at Step 120 illustrated in FIG. 13 is that the zoom dial 63 has been turned clockwise, the numerical value displayed in the display part 67 is increased at Step 121. When the decision is that the rotation has been in the counterclockwise direction, the numerical value is decreased at Step 122.

When the decision made at Step 92 illustrated in FIG. 8 is that the ten-key pad 71 has been manipulated, the subroutine for manipulation of the ten-key pad illustrated in FIG. 14 is executed. When the decision at Step 125 illustrated in FIG. 14 is that the set mode has been already established at Step 118, since the numerical value represents the frequently used zooming magnification to be altered, the numerical value introduced through the ten-key pad 71 is displayed in the display part 67 at Step 126. When the decision at Step 125 draws NO as an answer in spite of the input through the ten-key pad 71, the operation with the ten-key pad 71 is not meant for the alteration of magnification but for the injection of the number of copying papers to be used for transfer of the image. The numerical value in this case is displayed in a copy number display part (not shown) at Step 127. This copy number display part is formed of a seven-segment display device adapted to illuminate an integral number of two digits, for example. By depressing the print switch 64, the operation of copying is carried out on the indicated number of copying papers.

As described above, the numerical value of zooming magnification displayed in the display part 67 is altered by means of the zoom dial 63 or the ten-key pad 71. The memorization of a new magnification in the place of the existing frequently used zoom magnification is accomplished by the operation of any of the three magnification memory keys 68a to 70a illustrated in FIG. 6, on the condition that the set mode has been created by the depression of the magnification set key 72. The procedure for this memorization will be described with reference to the subroutine for memory illustrated in FIG. 12.

When the decision made at Step 130 is that the zoom lens 18a has been set in place and when the decision at Step 131 is that the magnification memory key 68a in the three magnification memory keys has been depressed, the altered numerical value in the display part 67 is displayed in the set magnification display part 68, this numerical value is memorized in the memory means, the set mode is canceled, and the numerical value in the set magnification display part 68 is displayed in the display part 67 by operating the zoom dial 63 or the ten-key pad 71 so as to allow Step 132 to form a decision that the set mode has been already set and display this fact in Steps 133 to 136. Conversely, in the absence of the set mode, the magnifications stored in the memory means are displayed as they are in the display part 67. When the magnifications mentioned above are displayed in the display part the zooming of the zoom lens 18a to the magnification in the memory is executed instantaneously in the subroutine for less motion at Step 94. When the decision made at Step 137 illustrated in FIG. 12 is that the memory key 69a of the three memory keys has been depressed, Steps 139 to 142 are executed similarly to Steps 133 to 136 on the condition that the set mode has been created at Step 138.

When the decision at Step 137 draws No as an answer, namely when the decision is that the magnification memory key 70a has been depressed, Steps 144 to 147 are executed on the condition that the set mode has been already created.

Steps 131 to 147 are the steps which are involved where the zoom lens 18a is attached. When the zoom lens 18a has been attached, this fact is confirmed at Step 148. When the magnification memory key 68a is depressed at Step 149, the correction of the new frequently used zooming magnification and the memorization and display of the corrected zooming magnification are effected through Steps 150 to 154 similarly to the procedure described above. The same procedure is performed when this zoom lens is attached and the magnification memory keys 69a and 78a are depressed. The flow chart of this procedure is omitted in FIG. 12.

Similarly, when the zoom lens 18c is set in place, this fact is discerned at Step 155 and the alteration or correction of the magnification memory and the display of the outcome of the alteration or correction are carried out.

FIG. 15 is a diagram illustrating the subroutine for lens motion at Step 94 illustrated in FIG. 8. At Step 160, the zooming magnification displayed in the display part 67 and the existing zooming magnification of the zoom lens currently set in place are compared and, when the comparison reveals a difference between the two values, the amount and direction of motion of the zoom lens are computed. On the basis of this computation, the zoom lens 18 is actuated at Step 161 and is consequently zoomed to the magnification displayed in the display part 67.

Though the illustrated embodiment represents a case using three freely detachable zoom lenses 18, the number of these zoom lenses is a matter for arbitrary decision. It may be four or five, for example. The number of frequently used zooming magnifications for each of the zoom lenses 18, is likewise a matter for arbitrary decision. It may be one or a plurality other than three, for example. Though the apparatus of the embodiment has been depicted as relying on the focus dial 62 to effect the adjustment of the focus, it may be configurated for the focus to be finely adjusted automatically.

In the reader printer described above, since the decision is made as to which of the plurality of zoom lenses has been set in place and, during the attachment of the zoom lens, this zoom lens is moved to the position of the selected standard zooming magnification, the control of the operation of the zoom lens can be effected inexpensively and infallibly by controlling the number of pulses supplied to the motor being operated for zooming.

Figure 16:
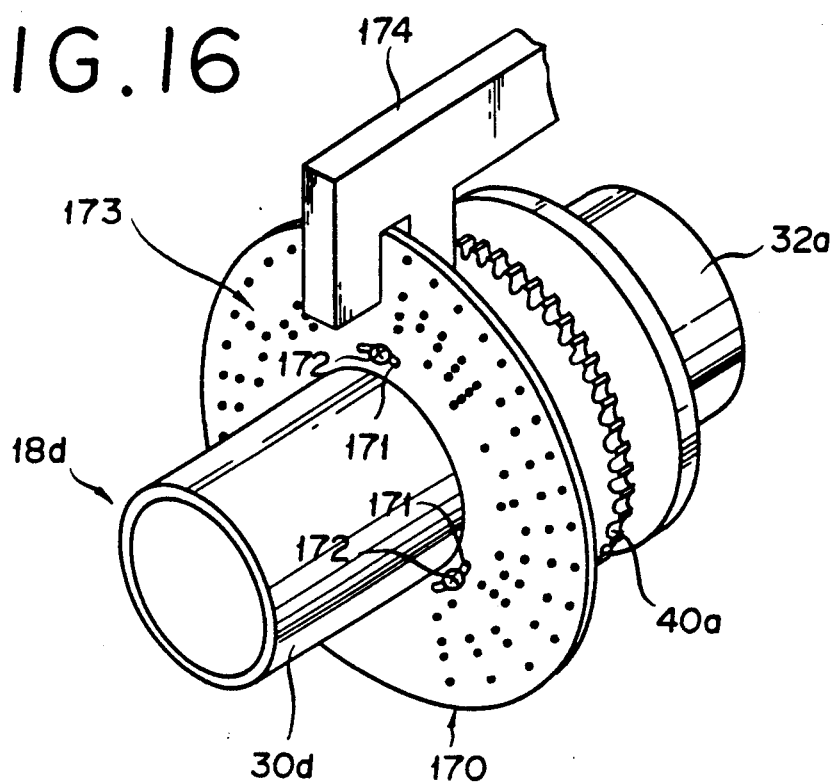
FIG. 16 is a perspective view illustrating a magnifying power detecting device for a zoom lens in yet another embodiment of the present invention.
Figure 17:
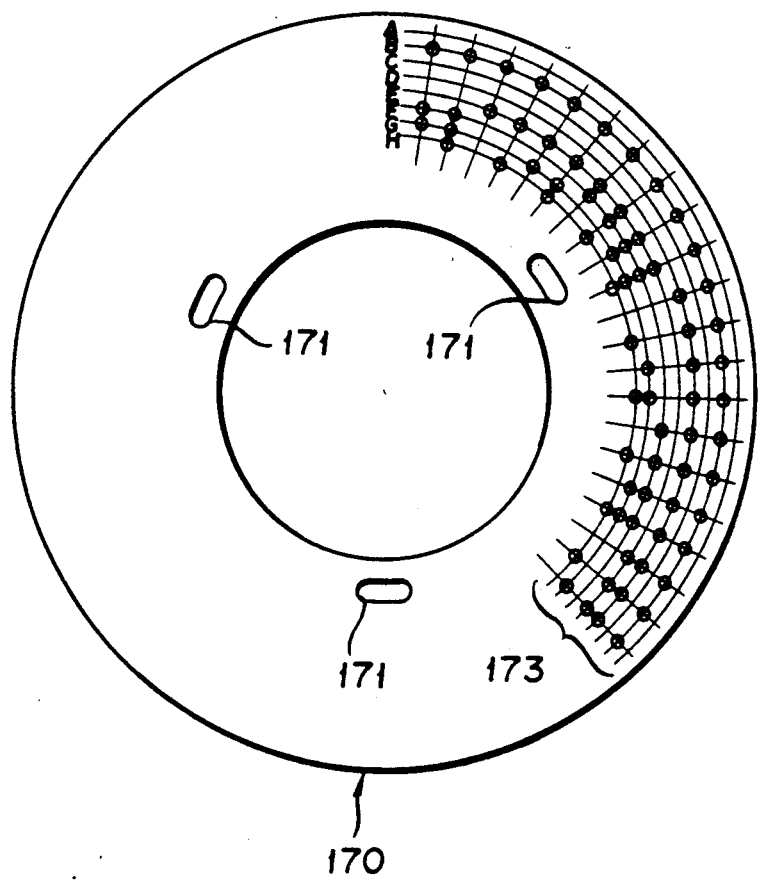
FIG. 17 is a front view illustrating a code disc appearing in FIG. 16.

FIG. 16 and FIG. 17 are diagrams illustrating another typical zoom lens 18d as another embodiment of this invention for the detection of zooming magnification. In a lens-barrel 30d accommodating a plurality of lenses therein, a zoom rotation member 32a is rotatably set in place. An annular gear 40a for rotating the zoom rotation member 32a thereby varying the zooming magnification is attached to the rotation member 32a. An annular code disc 170 is rotatably fitted in the lens-barrel 30d and this code disc 170 is fixed to the annular gear 40a. A plurality of arcuate oblong holes 171 are formed in the code disc 170. Screws 172 past through the oblong holes 171 are helically joined with screw holes (not shown) formed in the annular gear 40a, to fix the code disc 170 to the annular gear 40a. As a result, the position for the fixation of the code disc 170 relative to the annular gear 40a can be adjusted in the circumferential direction by rotating the code disc 170 within the range of length of the oblong holes 171.

In the disc 170, eight rows each of a group of small holes 173 separated with fixed angular intervals in the circumferential direction are formed in such a manner that the small holes are aligned radially as illustrated in FIG. 17. The groups of small holes 173 are distributed in the circumferential direction within a sector of an angle in the range of 100° to 150°. This zoom lens 18d possesses zooming magnifications of 7.0 to 9.0. The relation between the positions of these small holes and the zooming magnifications is as shown in the following table. In the table, the symbol "*" denotes the presence of a small hole.

TABLE

| MAGNIFICATION | A | B | C | D | E | F | G | H |
|---|---|---|---|---|---|---|---|---|
| 7.0 |   | * |   |   |   | * | * |   |
| 7.1 |   | * |   |   |   | * | * | * |
| 7.2 |   | * |   | * |   |   |   |   |
| 7.3 |   | * |   |   |   |   |   | * |
| 7.4 |   | * |   | * |   |   |   |   |
| 7.5 |   | * |   | * |   | * | * | * |
| 7.6 |   | * |   | * | * |   |   |   |
| 7.7 |   | * |   | * | * |   |   |   |
| 7.8 |   | * |   | * | * | * |   |   |
| 7.9 |   | * |   | * | * | * | * |   |
| 8.0 |   | * | * |   |   |   |   |   |
| 8.1 |   | * | * |   |   |   |   | * |
| 8.2 |   | * | * |   |   | * |   |   |
| 8.3 |   | * | * |   |   | * | * |   |
| 8.4 |   | * | * |   | * |   |   |   |
| 8.5 |   | * | * |   | * |   | * |   |
| 8.6 |   | * | * |   | * | * |   |   |
| 8.7 |   | * | * |   | * | * | * |   |
| 8.8 | * | * |   |   |   |   |   |   |
| 8.9 | * | * |   |   |   |   |   | * |
| 9.0 | * | * |   |   |   | * |   |   |

A sensor 174 has incorporated therein eight sets of photo-interrupters each formed of a pair of a light emitting element and a light receiving element. The individual photo-interrupters are opposed to the rows A to H of small holes.

In the present zoom lens 18d, when the operator sets a motor (not shown) rotating and consequently imparts a rotation to the annular gear 40a, the code disc 170 and the rotation member 32a are rotated in the same direction. The zooming magnification varies with the rotation of the rotation member 32a. The zooming magnification corresponding to the change in code is detected by the fact that the position of the disc 170 to be assumed in consequence of the rotation of the rotation member 32a is detected by the signals issued from the photo-interrupters formed in the sensor 174. When the zooming magnifications used for the plurality of zoom lenses have a fixed relationship of correspondence, the detection of the magnifications of the plurality of zoom lenses with one code disc can be realized by attaching the code disk to the annular gear 40 illustrated in FIG. 2.

When a plurality of zoom lenses are fastened in advance one each to turret plates or movable blocks and are freely selected for use, the apparatus of this invention for image projection can be applied to the use of these zoom lenses, though the combination inevitably adds notably to the dimensions of the entire system FIG. 18 illustrates a magnification detection part embodying the present invention for the selective use of three zoom lenses 18*3*, 18*f,* and 18*g* which are fixed on a movable base 180.

The movable base 180 is transfixed with a guide rod 181 and is enabled to reciprocate freely in the axial direction of the guide rod 181 as guided thereby. A drive threaded shaft 182 laid parallelly to the guide rod 181 is passed through the movable base 180 as helically joined with a threaded hole formed in the movable base 180. For the purpose of rotating the threaded shaft 182 and driving the movable base 180, a toothed wheel 184 attached to a motor 183 is meshed with a toothed wheel 185 attached to the threaded shaft 182.

The three zoom lenses fixed to the movable base 180 are adapted to have their zooming magnifications varied in a prescribed range by the rotation of rotation members 32*e*, 32*f,* and 32*g* fitted respectively in the lens-barrel 30*e*, 30*f,* and 30*g*. On the movable base 180, three discrimination plates 186*e*, 186*f,* and 186*g* are fixed as aligned respectively to the three zoom lenses 18*e* to 18*g*. For the detection of the arrival of any of the zoom lenses at the position of the path of projected light in consequence of the motion of the movable base 180, the reader printer body is fitted up with a sensor 187 adapted to be actuated by the discrimination plate. In FIG. 18, the zoom lens 18*f* is depicted as located at the position of the path of projected light. The movable base 180 is provided with a control plate 188 extended along the direction of the motion of the movable base. Owing to the fact that the sensor 189 detects the control plate 188, the position of the movable base 180 is detected and the operation of the motor 183 is controlled in accordance with the position of the movable base 180. Thus, by causing the zoom lens positioned in the path of projected light to move over a prescribed distance at a prescribed speed proportionate to the magnification in projection, the scanning motion of the lens during the print mode of the system is controlled by the motor 183.

The rotation members 32*e*, 32*f,* and 32*g* of the zoom lenses are fitted up respectively with timing pulleys 190*e*, 190*f,* and 190*g*. An endless timing belt 194 is hung round these timing pulleys, a pulley 192 attached to the spindle of a motor 191 provided on the movable base 180, and a pulley 193 attached rotatably to the movable base 180.

To a bracket 195 fixed on the movable base 180, two pulleys 196, 197 are rotatably attached with the aid of supporting members (not shown). These pulleys 196, 197 have a larger diameter than the pulley 193. The pulley 193 is interlocked to the pulley 196 and is rotated jointly with this pulley 196. An endless code belt 198 is hung round the pulleys 196, 197. The code belt 198 is so adapted that the speed of this motion is greater than the peripheral speed of the lens mount. A plurality of rows each of a group of small holes 199 are formed in the code belt 198 in such a manner that the groups of small holes 199 represent a fixed code. For the purpose of detecting the zooming magnifications of the three zoom lenses, three sensors 201 to 203 are disposed on the bracket 195 so as to enclose the obverse and reverse surfaces of the code belt 198. Each of these sensors incorporates therein a plurality of sets of photo-interrupters each composed of a light receiving element and a light emitting element. These sensors 201 to 203 are adapted to be freely reciprocated by moving members (not shown) in the direction indicated by the arrow X. Thus, the sensors are caused to produce an adjusted motion such that the relative positions of the sensors and the code belt 198 coincide with the magnifications of the zoom lenses.

For the operation of the reader printer to which the zoom lenses are attached as illustrated in FIG. 18, the operator manipulates pertinent keys installed on the operation panel to actuate the motor 183 and move the pertinent zoom lens to the position in the path of projected light. When an increase or a decrease in the zooming magnification is indicated, the motor 191 is actuated and the motive power consequently generated is transmitted to the timing belt 194. As a result, the rotation members 32*e*, 32*f,* and 32*g* are set rotating and, at the same time, the code belt 198 is driven. The changes of code represented by the groups of small holes 199 correspond to the magnifications of zoom lenses. A change in the magnification of a zoom lens, therefore, can be detected by the detection of the change in code by the sensor.

When the timing belt 194 is hung round the pulleys in such a manner that the direction of rotation of the rotation member 32*f* of the zoom lens 18*f* is opposite to that of rotation of the rotation members 32*e*, 32*g* of the other two zoom lenses 18*e*, 18*g* and the ranges of magnifications of the three zoom lenses are set so as to adjoin continuously each other the zoom lenses as a whole are allowed to have magnifications varied continuously over a very wide range.

We claim:

1. An image projection apparatus for projecting an image onto an image receiving medium, comprising;
   a plurality of zoom lenses having different magnification ranges from each other;
   memory means for memorizing a specific magnification corresponding to each zoom lens;
   identifying means for identifying the zoom lens selected from the plurality of zoom lenses to be used; and
   setting means responsive to said identifying means for setting the magnification of the selected zoom lens to the specific magnification memorized by said memory means.

2. An image projection apparatus for projecting an image onto an image receiving medium, comprising
   a plurality of zoom lenses having different magnification ranges from each other;
   memory means for memorizing a plurality of specific magnifications corresponding to each zoom lens;
   identifying means for identifying the zoom lens selected from the plurality of zoom lenses to be used;
   indicating means responsive to said identifying means for indicating the plurality of the specific magnifications memorized by said memory means corresponding to the selected zoom lens;
   designating means for designating the desired magnification from the specific magnifications indicated by said indicating means; and
   setting means for setting the magnification of the selected zoom lens to the desired magnification designated by said designating means.

3. An image projection apparatus according to claim 2, further comprising
display means for displaying the desired magnification designated by said designating means.

4. An image projection apparatus according to claim 2, wherein said indicating means includes a plurality of indicators for indicating the plurality of the specific magnifications memorized by said memory means corresponding to the selected zoom lens, respectively.

5. An image projection apparatus according claim 4, wherein said designating means includes a plurality of keys each corresponding to each of said indicators for designating the desired magnification from the specific magnifications indicated.

6. An image projection apparatus according to claim 2, wherein said plurality of the specific magnifications memorized by said memory means are variable to correct.

7. A image projection apparatus for projecting an image onto an image receiving medium, comprising:
a plurality of zoom lenses having different magnification ranges from each other;
memory means for memorizing a plurality of specific magnifications corresponding to each zoom lens;
identifying means for identifying the zoom lens selected from the plurality of zoom lenses to be used;
indicating means responsive to said identifying means for indicating the plurality of the specific magnifications memorized by said memory means corresponding to the selected zoom lens:
designating means for designating the magnification from the specific magnifications indicated by said indicating means;
input means for inputting a magnification;
display means for displaying either the magnification designated by said designating means or the magnification inputted by said input means; and
setting means for setting the magnification of the selected zoom lens to the magnification displayed by said display means.

8. An image projection apparatus according to claim 7, wherein said indicating means includes a plurality of indicators for indicating the plurality of the specific magnifications memorized by said memory means corresponding to the selected zoom lens, respectively.

9. An image projection apparatus according to claim 8, wherein said designating means includes a plurality of keys each corresponding to each of said indicators for designating the desired magnification from the specific magnifications indicated.

10. An image projection apparatus according to claim 7, wherein said plurality of the specific magnifications memorized by said memory means are variable to correct.

11. An image projection apparatus according to claim 7, wherein said input means includes a dial for inputting a magnification by a rotating operation thereof.

12. An image projection apparatus according to claim 7, wherein said input means includes ten keys for inputting numerical information as a magnification.

13. An image projection apparatus according to claim 7, wherein each of said zoom lenses comprises an engaging part to be joined with a holder which supports one of said zoom lenses, said engaging part including an identifying part for indicating the particular zoom lens, and said holder comprising a sensor for detecting said identifying part and consequently detecting the particular zoom lens, whereby the one zoom lens to be used is discriminated.

14. An image projection apparatus for projecting an image onto an image receiving medium, comprising:
a plurality of zoom lenses having different magnification ranges from each other;
memory means for memorizing a plurality of specific magnifications corresponding to each zoom lens;
identifying means for identifying the zoom lens selected from the plurality of zoom lenses to be used;
indicating means responsive to said identifying means for indicating the plurality of the specific magnification memorized of said memory means corresponding to the selected zoom lens;
designating means for designating the magnification from the specific magnifications indicated by said indicating means;
input means for inputting a magnification;
displaying means for displaying either the magnification designated by said designating means or the magnification inputted by said input means;
setting means for setting the magnification of the selected zoom lens to the magnification displayed by said display means;
a rotation member rotatably attached to each of said zoom lenses and adapted to vary the zooming magnification; and
a driving ring having a drive side engaging part to be joined with a following side engaging part formed in said rotation member and adapted to drive said rotating member, whereby said drive side engaging part and said following side engaging part come into mutual engagement only when said following side engaging part is set to the position at which said zoom lenses assume the standard magnifications set in advance.

15. An image projection apparatus according to claim 1, which further comprising control means for supplying a drive signal to the motor for driving said drive ring until the standard magnification of the zoom lens to be used reaches the prescribed zooming magnification.

16. An image projection apparatus for projecting an image onto an image receiving medium, comprising:
a plurality of zoom lenses having different magnification ranges from each other;
memory means for memorizing a plurality of specific magnifications corresponding to each zoom lens;
identifying means for identifying the zoom lens selected from the plurality of zoom lenses to be used;
indicating means responsive to said identifying means for indicating the plurality of the specific magnifications memorized by said memory means corresponding to the selected zoom lens;
designating means for designating the magnification from the specific magnifications indicated by said indicating means;
input means for inputting a magnification;
display means for displaying either the magnification designated by said designating means or the magnification inputted by said input means;
setting means for setting the magnification of the selected zoom lens to the magnification displayed by said display means;
a moving member supporting said plurality of zoom lenses attached thereto;
identifying parts provided on said moving member at positions corresponding to positions of said zoom lenses for serving to discriminate said zool lenses from each other;

means for introducing one of said plurality of zoom lenses to be used;

means for driving said moving member in response to a signal from said input means thereby setting a particular zoom lens at a prescribed position; and a sensor for detecting the position of said identifying part and consequently confirming that the particular zoom lens to be used has been moved to the prescribed position.

17. An image projection apparatus according to claim 7, which further comprising a code member provided for each of said zoom lenses and interlocked with a rotation member for varying the zooming magnification, and a photo-interrupter for detecting the zooming magnification in accordance with the positions of holes formed in said code member.

18. An image projection apparatus with one or more zoom lenses for projecting an image into an image receiving surface, the improvement comprising:

memory means for storing a predetermined magnification corresponding to a specific zoom lens;

identifying means for identifying the specific zoom lens, and setting means responsive to said identifying means for setting the magnification of the specific zoom lens to the predetermined magnification stored in said memory means.

19. A method of projecting an image recorded on a microfilm onto an image receiving surface by using one or more zoom lenses, comprising the steps of:

storing a predetermined magnification in a memory corresponding to a specific zoom lens;

identifying the specific zoom lens, and setting the magnification of the zoom lens to the predetermined magnification stored in the memory when the specific zoom lens is identified.

20. In an image projection apparatus with a plurality of zoom lenses for projecting an image onto an image receiving surface, the improvement comprising:

indicating means for indicating a plurality of magnifications;

identifying means for identifying the zoom lens;

means responsive to said identifying means for varying the plurality of magnifications indicated by said indicating means;

designating means for designating a desired one from the plurality of magnifications indicated by said indicating means, and setting means for setting the magnification of the zoom lens to the predetermined magnification designated by said designating means.

21. In an image projection apparatus with a plurality of zoom lenses for projecting an image onto an image receiving surface, the improvement comprising:

memory means for storing a plurality of predetermined magnifications;

indicating means for indicating a magnification;

identifying means for identifying the zoom lens;

means responsive to said identifying means for causing said indicating means to indicate a predetermined magnification selected from said plurality of predetermined magnifications, the selected magnification being included in a magnification range of the identified zoom lens.

22. An image projection apparatus for projecting an image onto an image receiving surface, comprising:

supporting means for supporting a zoom lens;

memory means for storing a plurality of predetermined magnifications;

indicating means for indicating a magnification;

identifying means for identifying a magnification range of the zoom lens supported by said supporting means, and means responsive to said identifying means for causing said indicating means to indicate a predetermined magnification selected from said plurality of predetermined magnifications, the selected magnification being included in the identified magnification range.

23. An image projection apparatus for projecting an image onto an image receiving surface, comprising:

supporting means for supporting a zoom lens;

memory means for storing a plurality of predetermined magnifications;

indicating means for indicating a plurality of magnifications;

identifying means for identifying a magnification range of the zoom lens supported by said supporting means;

means responsive to said identifying means for causing said indicating means to indicate one or more predetermined magnifications, the selected magnifications being included in the identified magnification range;

designating means for designating a desired one from the selected magnifications which are indicated by said indicating means, and setting means for setting the magnification of the zoom lens to the predetermined magnification designated by said designating means.

* * * * *